United States Patent [19]

Moore et al.

[11] Patent Number: 5,251,241
[45] Date of Patent: Oct. 5, 1993

[54] NUCLEAR STEAM GENERATOR WRAPPER CLOSURE ASSEMBLY AND METHOD OF INSTALLING SAME

[75] Inventors: Jay T. Moore, Milton; John R. Bayless, Pensacola, both of Fla.

[73] Assignee: Westinghouse Electric Corp., Pittsburgh, Pa.

[21] Appl. No.: 937,761

[22] Filed: Aug. 28, 1992

[51] Int. Cl.[5] .............................. G21C 13/00
[52] U.S. Cl. ................................ 376/204; 376/203
[58] Field of Search ............... 376/203, 204, 245, 249; 122/511, 360; 165/71

[56] References Cited

U.S. PATENT DOCUMENTS

| | | | |
|---|---|---|---|
| 3,136,447 | 6/1964 | Lawrence | 220/46 |
| 3,533,530 | 10/1970 | Gallo et al. | 220/46 |
| 4,178,966 | 12/1979 | Savor et al. | 138/89 |
| 4,312,708 | 1/1982 | Leslie | 376/203 |
| 4,454,957 | 6/1984 | Kwech et al. | 220/323 |
| 4,548,783 | 10/1985 | Dalke et al. | 376/204 |
| 4,644,908 | 2/1987 | Matusz | 122/511 |
| 4,671,518 | 6/1987 | Retz | 277/1 |
| 4,693,389 | 9/1987 | Kalen | 220/236 |
| 4,820,474 | 4/1989 | Leslie et al. | 376/203 |
| 4,948,550 | 8/1990 | Worthy | 376/203 |
| 5,100,610 | 3/1992 | Pirl et al. | 376/260 |

Primary Examiner—Donald P. Walsh
Assistant Examiner—Meena Chelliah
Attorney, Agent, or Firm—A. Addessi

[57] ABSTRACT

An apparatus and method for plugging an access hole in a steam generator, having a shell, a wrapper, and an annulus positioned between the shell and the wrapper, includes attaching a plate, having a first mating connection and at least one aperture, to the wrapper of the steam generator. A plug, having a second mating connection and at least one aperture, is positioned within a bore of the plate. The plug is rotated approximately 90° for engaging the first mating connection of the plate with a second mating connection of the plug and for aligning the aperture of the plug with the aperture of the plate. A sleeve, having a bore therethrough and at least one aperture, is positioned on the plug and the aperture of the sleeve is aligned with the apertures of the plate and the plug. A pin is installed in the aligned apertures of the plate, the plug, and the sleeve. A retaining nut is positioned on the plug after installation of the sleeve.

17 Claims, 4 Drawing Sheets

NUCLEAR STEAM GENERATOR WRAPPER CLOSURE ASSEMBLY AND METHOD OF INSTALLING SAME

BACKGROUND OF THE INVENTION

This invention relates to hole plugs and, more particularly, to a nuclear steam generator wrapper closure assembly and method of installing means for plugging access holes in the wrapper section of a nuclear steam generator.

Steam generators, which may be used in a nuclear steam supply system, may have access holes located in the outer shell and wrapper of the steam generator for providing a passageway into the interior of the steam generator. During operation of the steam generator, the wrapper internal access holes are plugged. The outer shell access hole is sealed with a cover, which is not connected to the wrapper access hole plug.

To plug the access hole of the wrapper, an oblong plate is inserted through a corresponding oblong access hole in the wrapper of the steam generator, rotated by 90°, and held in place against the inside of the wrapper by a second oblong plate, a retaining nut, and a locking tab washer. However, to insure that disassembly of the plug does not occur during operation of the steam generator, alignment of the oblong plates during installation of the plug is time consuming. Also, the installation of the plug into the steam generator is time consuming and there is potential for dropping loose components into the interior of the steam generator.

Therefore, what is needed is a nuclear steam generator wrapper closure assembly which provides a positive alignment of components during assembly and which provides a means for minimizing the possibility of loose components entering the tube bundle area of the steam generator.

SUMMARY OF THE INVENTION

A nuclear steam generator wrapper closure assembly for plugging an access hole in a steam generator, having a shell, a wrapper, and an annulus positioned between the shell and the wrapper, includes a plate, which is attached to the wrapper. The plate has a bore, a first mating connection on an inside diameter of the plate, and at least one aperture. A plug having a first end and a second end is positioned within the bore of the plate. The first end of the plug has a second mating connection for engagement with the first mating connection of the plate. The second mating connection has at least one aperture which aligns with the aperture through the first mating connection.

A sleeve, which is positioned on the plug, has a first end, a second end, and a bore therethrough. The first end of the sleeve, which is positioned adjacent the first end of the plug, when the sleeve is disposed on the plug, has at least one aperture which aligns with the apertures in the first and second mating connections. A pin is positioned in the aligned apertures of the sleeve, the first mating connection, and the second mating connection.

A method for plugging an access hole in a nuclear steam generator, having a shell, a wrapper, and an annulus positioned between the shell and the wrapper, includes the step of attaching a plate, having a first mating connection and at least one aperture, to the wrapper of the steam generator. A plug, having a second mating connection and at least one aperture, is positioned within a bore of the plate. The plug is rotated approximately 90° for engaging the first mating connection of the plate with a second mating connection of the plug and for aligning the aperture of the plug with the aperture of the plate.

A sleeve, having a bore therethrough and at least one aperture, is positioned on the plug and the apertures of the sleeve are aligned with the apertures of the plate and the plug. A pin is installed in the aperture of the plate, the aperture of the plug, and the aperture of the sleeve when the apertures are aligned.

The method further includes the steps of positioning a retaining nut on the plug after installing the sleeve and crimping the retaining nut onto the plug. The pin may be attached to the sleeve prior to installing the sleeve onto the plug.

The design of the closure assembly provides for minimal installation effort, minimizes the possibility of loose parts entering the tube bundle area, minimizes the number of components small enough to pass through the annulus, minimizes the creation of a flow path through the wrapper due to component failure and provides for positive alignment of components during assembly.

BRIEF DESCRIPTION OF THE DRAWINGS

While the specification concludes with claims particularly pointing out and distinctly claiming the subject matter of the invention, it is believed the invention will be better understood from the following description, taken in conjunction with the accompanying drawings, wherein:

DESCRIPTION OF THE PREFERRED EMBODIMENT

The invention described herein provides an wrapper closure assembly for a nuclear steam generator which may be positively aligned during assembly and which has a reduced number of components which may become loose and move throughout the steam generator.

Figure 1:
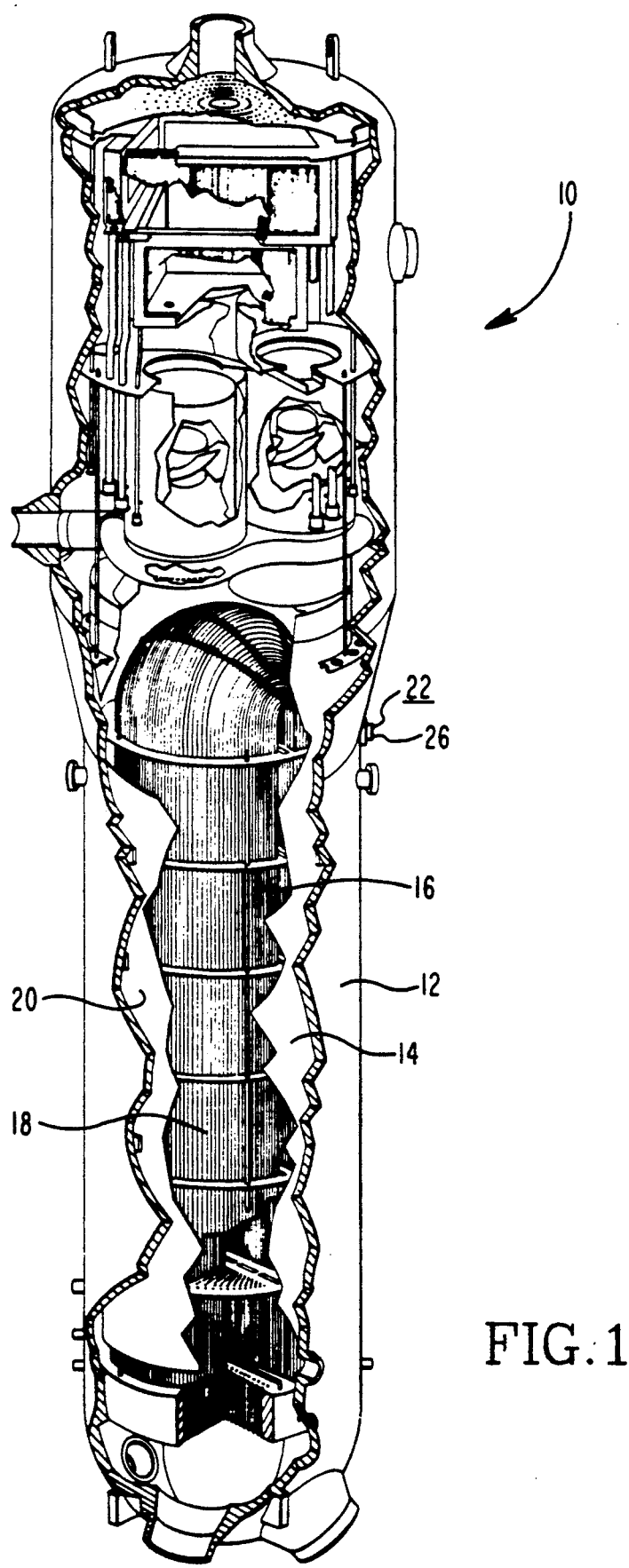
FIG. 1 is a perspective view of a nuclear steam generator having an inspection port closure assembly.

Referring to FIG. 1, a nuclear steam generator 10 is shown including a generally cylindrical shell 12 having an upper portion and a lower portion. Disposed in the lower portion is a wrapper 14, which encircles a tube bundle 16. The tube bundle 16 has a plurality of vertical U-shaped steam generator tubes 18. An annulus 20 is formed in the space between the wrapper 14 and the shell 12.

Figure 2:
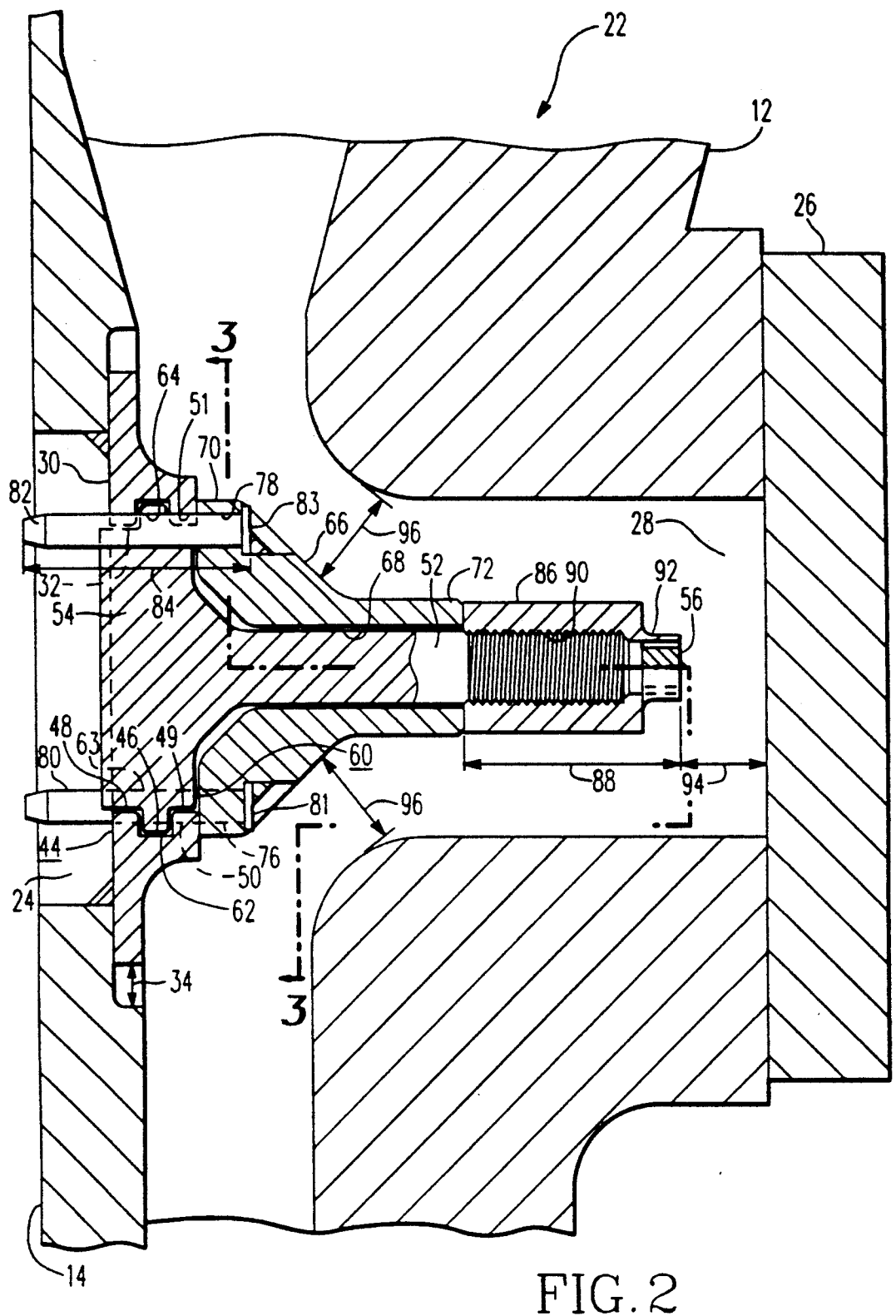
FIG. 2 is a sectional view of the inspection port closure assembly.

Referring to FIGS. 1 and 2, the steam generator 10 has an inspection port or wrapper closure assembly 22, which may be used to plug an opening in the steam generator 10, such as an access hole 24 in the wrapper 14. A cover plate 26 is positioned on a hole 28 in the shell 12 for enclosing the inspection port closure assembly 22 within the steam generator 10.

Figure 3:
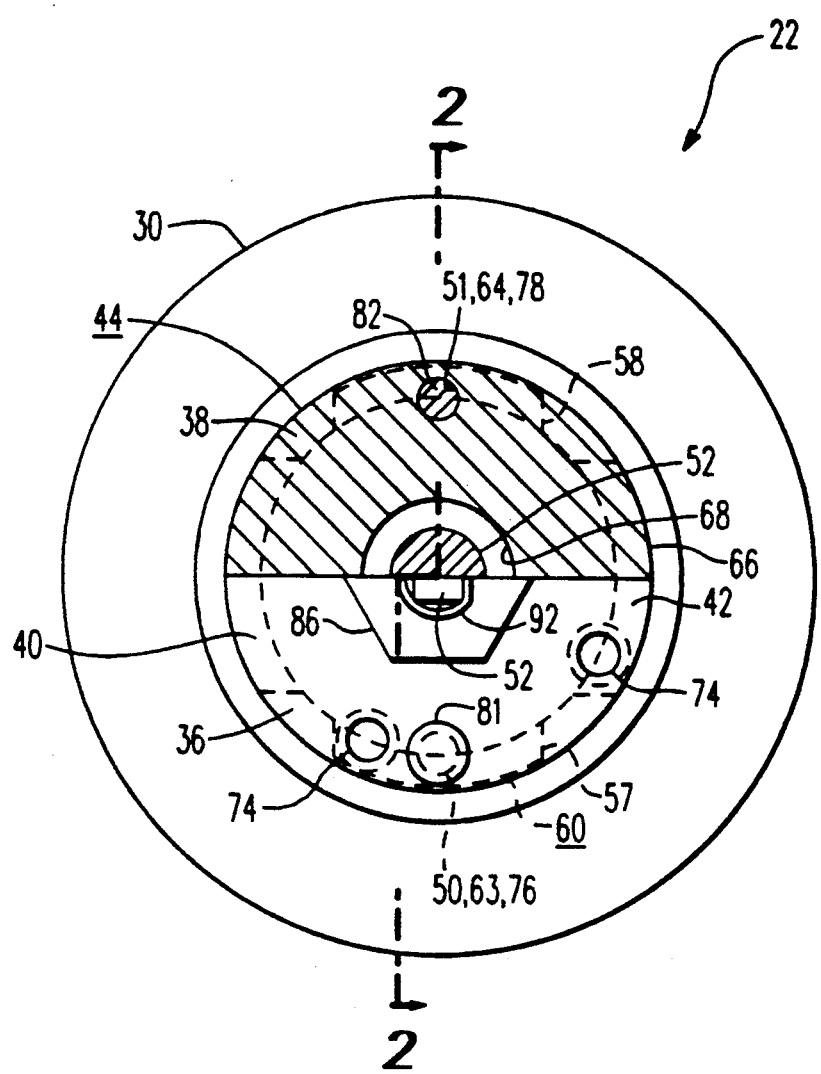
FIG. 3 is a partial sectional plan view of the inspection port closure assembly.
Figure 4:
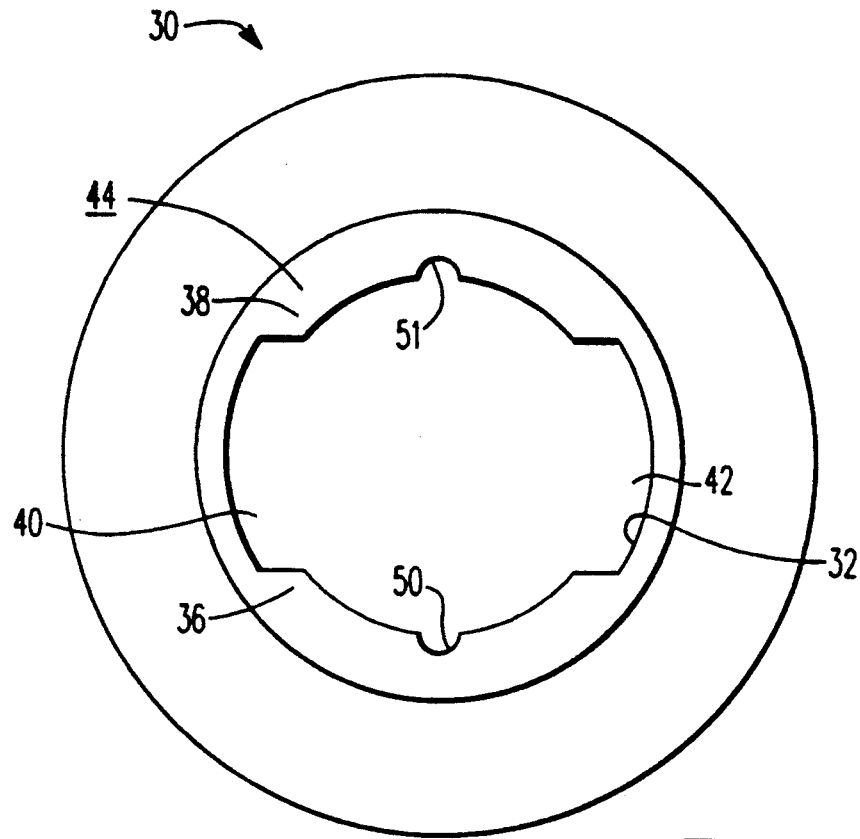
FIG. 4 is an elevational view of a plate prior to installation of the plate into the inspection port closure assembly.

Referring to FIGS. 2, 3 and 4 a plate 30 has a bore 32 therethrough. The plate 30 is attached, such as by welding, to the wrapper 14 in a manner so that the bore 32 is adjacent to and in-line with the access hole 24 for providing an accessway through the wrapper 14 of the steam generator 10. A clearance 34 exists between an end of the plate 30 and the wrapper 14 for allowing alignment with the hole 28 in the shell 12 prior to welding the plate 30 to the wrapper 14.

The plate 30 has a first flange 36, which extends toward the center of the bore 32, and a second flange 38, which is positioned substantially opposite to the first flange 36 and extends toward the center of the bore 32. The positioning of the first and second flanges 36 and 38 provides a first opening 40 and a second opening 42 between the ends of the flanges 36 and 38.

The first and second flanges 36 and 38 of the plate 30 have a first mating connection 44. As an example, the first mating connection 44 has a groove 46 positioned between a first lip 48 and a second lip 49. Also, the lip 48 functions to prevent entry of the components of the inspection port closure assembly 22 through the access hole 24 into the tube bundle area of the steam generator 10.

The first flange 36 of the plate 30 has a first aperture 50. The second flange 38 of the plate 30 has a second aperture 51. As an example, and as illustrated in FIGS. 3 and 4, the first aperture 50 is positioned substantially opposite to the second aperture 51.

Referring to FIGS. 2-5, the inspection port closure assembly 22 includes a plug 52, which has a first end 54 and a second end 56. The first end 54 is a substantially circular plate integrally attached to a shaft or the second end 56. The first end 54 has a first flange 57 and a second flange 58 positioned substantially opposite to the first flange 57. The first and second flanges 57 and 58 of the plug 52 are sized to fit within the first and second openings 40 and 42 of the plate 30.

The first and second flanges 57 and 58 of the plug 52 have a second mating connection 60, which is mateably engagable with the first mating connection 44 of the plate 30. As an example, the second mating connection 60 has a collar 62 which is engagable with the groove 46 of the first mating connection 44 of the plate 30.

Figure 5:
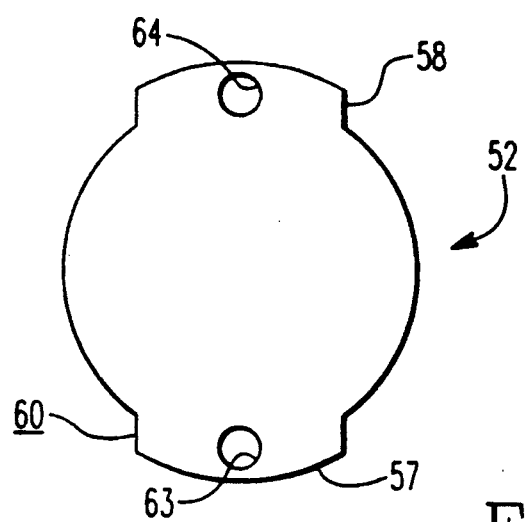
FIG. 5 is an elevational view of a plug prior to installation into the plate.

The plug 52 has a first aperture 63 and a second aperture 64. As an example, and as illustrated in FIGS. 3 and 5, the first aperture 63 is positioned substantially opposite to the second aperture 64.

The second end 56 of the plug 52 has a square end for enabling a tool (not shown) to rotate the plug 52 during installation or disassembly of the inspection port closure assembly 22.

During installation of the inspection port closure assembly 22, the plug 52 is inserted into the plate 30 with the first and second flanges 57 and 58 of the plug 52 aligned with the first and second openings 40 and 42 of the plate 30. Then, the plug 52 is rotated approximately 90° to engage the first and second mating connections 44 and 60. When the plug has been rotated 90°, the first aperture 50 of the plate 30 is aligned with the first aperture 63 of the plug 52 and the second aperture 51 of the plate 30 is aligned with the second aperture 64 of the plug 52.

The inspection port closure assembly 22 also includes a sleeve 66, which has a bore 68 therethrough. The sleeve 66 has a first end 70 and a second end 72. The sleeve 66 has at least one threaded bore 74 for providing a means of installing and removing the sleeve 66. Preferably, the sleeve has four bores 74. During installation, the sleeve 66 is slid onto the second end 56 of the plug 52 and the first end 70 of the sleeve 66 seats against the first end 54 of the plug 52. The second end 56 of the plug 52 extends through the bore 68 of the sleeve 66.

The first end 70 of the sleeve 66 has a first aperture 76 and a second aperture 78, which, as an example, is positioned substantially opposite to the first aperture 76. When the sleeve 66 is installed on the plug 52, the first aperture 76 of the sleeve 66 aligns with a first aperture 63 in the plug 52 and the first aperture 50 in the plate 30. Also, the second aperture 78 of the sleeve 66 aligns with the second aperture 64 of the plug 52 and the second aperture 51 of the plate 30.

A first pin 80, having a head 81, is positioned within the first aperture 76 of the sleeve 66, the first aperture 63 of the plug 52, and the first aperture 50 of the plate 30. A second pin 82, having a head 83, is positioned within the second aperture 78 of the sleeve 66, the second aperture 64 of the plug 52, and the second aperture 51 of the plate 30. The pins 80 and 82 have a length 84. The heads 81 and 83 have an outside diameter larger than the apertures 76 and 78 of the sleeve 66 for preventing the pins 80 and 82 from slipping through the apertures into the access hole 24.

The first and second pins 80 and 82 may be attached to the sleeve 66, such as by welding, for enabling the pins 80 and 82 to be installed as the sleeve 66 is positioned on the plug 52. The attachment of the pins 80 and 82 to the sleeve 66 minimizes the possibility of the pins 80 and 82 entering the annulus 20 between the shell 12 and the wrapper 14.

The alignment of the apertures provides a positive means of verifying that the plug 52 was installed correctly. Installation of the sleeve 66, including the attached pins 80 and 82, is not possible until correct alignment of the apertures is obtained.

A retaining nut 86, having a length 88, has a bore 90 therethrough. The retaining nut 86 is positioned on the plug 52 and tightened to a prescribed torque after installation of the sleeve 66 onto the plug 52. The retaining nut 86 has a locking means, such as a thin wall 92, which may be crimped onto the second end 56 of the plug 52. Preferably, the retaining nut 86 is crimped onto the plug 52 on two opposite sides. The locking crimp feature integrated with the retaining nut 86 eliminates the need to use a separate small locking tab washer, which may become loose. Also, the positioning of the locking means at the outermost location provides for easy access during installation.

After installation of the inspection port closure assembly 22, the cover plate 26 is positioned over the hole 28 and attached to the shell 12 of the steam generator 10. A distance 94 between the installed cover plate 26 and the retaining nut 86 is less than the length 88 of the retaining nut 86 for preventing disassembly during operation of the steam generator 10. If the locking means on the retaining nut 86 should fail and allow un-torquing of the retaining nut, the retaining nut 86 will contact the cover plate 26 and stop before disengaging from the plug 52. The sleeve 66 and pins 80 and 82 may retract by the same amount. Because the length 84 of the pins 80 and 82 is greater than the amount of the retraction, the pins 80 and 82 will not disengage from the plate 30 and the plug 52, maintaining the engagement of the plug 52 with the plate 30. Rotation of the plug 52 is prevented, thus eliminating the possibility of creating a flow path through the wrapper 14.

A distance 96 between the shell 12 and the sleeve 66 is less than the outside diameter of the retaining nut 86 for preventing a loose retaining nut 86 from entering the annulus 20, such as during installation of the inspection port closure assembly 22. The sleeve 66 and plug 52 are also sized to prevent the sleeve 66 and the plug 52 from entering the annulus 20 should these components be dropped during installation or disassembly.

Therefore, the invention provides a method and apparatus for plugging an opening which has a minimal number of components which may become loose during operation, which has a positive means of aligning the components during assembly, and which is easily installed.

We claim:

1. A wrapper closure assembly for plugging an access hole in a nuclear steam generator, having a shell, a wrapper, and an annulus positioned between the shell and the wrapper, comprising:

a plate, attached to the wrapper, having a bore therethrough and a first mating connection on an inside diameter of the plate, the first mating connection having at least one aperture;

a plug having a first end and a second end, the first end of the plug having a second mating connection for engagement with the first mating connection of the plate to prevent entry of said plug through the access hole and into the steam generator, the second mating connection having at least one aperture which aligns with the aperture through the first mating connection;

a sleeve having a first end, a second end, and a bore therethrough, the first end of the sleeve being positioned adjacent the first end of the plug when the sleeve is disposed on the plug, the first end of the sleeve having at least one aperture which aligns with the apertures in the first and second mating connections; and a pin positioned in the apertures of the sleeve, the first mating connection, and the second mating connection.

2. The wrapper closure assembly according to claim 1, further comprising a retaining nut, positioned on the plug, having a locking means for retaining the sleeve.

3. The wrapper closure assembly according to claim 2, wherein the locking means of the retaining nut is an integrally attached thin wall.

4. The wrapper closure assembly according to claim 2, wherein the second end of the plug is engagable with the locking means of the retaining nut.

5. The wrapper closure assembly according to claim 1, wherein the first mating connection of the plate has a groove and the second mating connection of the plug has a collar, which is engagable with the groove.

6. The wrapper closure assembly according to claim 1, wherein the pins are welded to the sleeve.

7. The wrapper closure assembly according to claim 1, wherein the length of the retaining nut is greater than the distance between an installed plug and an installed cover plate, which is positioned over the access hole of the steam generator, for preventing the retaining nut from disengaging from the plug during operation of the steam generator.

8. The wrapper closure assembly according to claim 7, wherein the length of the pin is greater than a distance of retraction of the retaining nut for maintaining engagement of the pin with the plate and the plug.

9. The wrapper closure assembly according to claim 1, wherein the pin has a head, which has an outside diameter larger than the aperture of the sleeve for preventing the pin from entering the access hole.

10. A nuclear steam generator, comprising:
a shell having a hole;
a plurality of tubes forming a tube bundle and disposed within the shell;
a wrapper, having an access hole, encircling the tube bundle and forming an annulus between the shell and the wrapper;
a cover positioned on the hole of the shell;
a plate, attached to the wrapper, having a bore therethrough and a first mating connection, the first mating connection having at least one aperture;
a plug having a first end and a second end, the first end of the plug having a second mating connection for engagement with the first mating connection of the plate to prevent entry of said plug through the access hole and into the steam generator, the second mating connection having at least one aperture which aligns with the aperture through the first mating connection;
a sleeve having a first end, a second end, and a bore therethrough, the first end of the sleeve being positioned adjacent the first end of the plug when the sleeve is disposed on the plug, the first end of the sleeve having at least one aperture which aligns with the apertures in the first and second mating connections; and
a pin positioned in the apertures of the sleeve, the first mating connection, and the second mating connection.

11. The steam generator according to claim 10, further comprising a retaining nut, positioned on the plug, having a locking means for retaining the sleeve.

12. The steam generator according to claim 10, wherein the first mating connection of the plate has a groove and the second mating connection of the plug has a collar, which is engagable with the groove.

13. A method for plugging an access hole in a nuclear steam generator, having a shell, a wrapper, and an annulus positioned between the shell and the wrapper, comprising the steps of:

attaching a plate, having a first mating connection and at least one aperture, to the wrapper of the steam generator;

positioning a plug, having a second mating connection and at least one aperture, within a bore of the plate;

rotating the plug approximately 90° for engaging the first mating connection of the plate with the second mating connection of the plug and for aligning the aperture of the plug with the aperture of the plate;

positioning a sleeve, having a bore therethrough and at least one aperture, on the plug;

aligning the aperture of the sleeve with the apertures of the plate and the plug; and installing a pin in the aperture of the plate, the aperture of the plug, and the aperture of the sleeve when the apertures are aligned.

14. The method of plugging an access hole according to claim 13, further comprising the step of positioning a retaining nut on the plug after installing the sleeve.

15. The method of plugging an access hole according to claim 14, further comprising the step of crimping the retaining nut onto the plug.

16. The method of plugging an access hole according to claim 13, further comprising the step of attaching the pin to the sleeve prior to installing the sleeve onto the plug.

17. The method of plugging an access hole according to claim 13, wherein the step of positioning the plug within the bore of the plate includes positioning at least one flange of the plug within an opening which extends from the bore of the plate.

* * * * *